United States Patent [19]
Paranjpe

[11] Patent Number: 5,601,366
[45] Date of Patent: Feb. 11, 1997

[54] METHOD FOR TEMPERATURE MEASUREMENT IN RAPID THERMAL PROCESS SYSTEMS

[75] Inventor: Ajit P. Paranjpe, Plano, Tex.

[73] Assignee: Texas Instruments Incorporated, Dallas, Tex.

[21] Appl. No.: 329,014

[22] Filed: Oct. 25, 1994

[51] Int. Cl.$^6$ .................................................. G01J 5/10
[52] U.S. Cl. .................... 374/126; 374/128; 374/124; 374/9
[58] Field of Search ........................... 374/126, 128, 374/9, 124; 392/416

[56] References Cited

U.S. PATENT DOCUMENTS

| | | | |
|---|---|---|---|
| 4,821,219 | 4/1989 | Kienitz et al. | 374/9 |
| 4,969,748 | 11/1990 | Crowley et al. | 374/126 |
| 5,061,084 | 10/1991 | Thompson et al. | 374/128 |
| 5,114,242 | 5/1992 | Gat et al. | 374/128 |
| 5,156,461 | 10/1992 | Moslehi et al. | 374/126 |
| 5,226,732 | 7/1993 | Nakos et al. | 374/126 |
| 5,305,417 | 4/1994 | Najm et al. | 374/126 |
| 5,442,727 | 8/1995 | Fiory | 374/126 |
| 5,444,815 | 8/1995 | Lee et al. | 374/126 |
| 5,460,451 | 10/1995 | Wadman | 374/126 |

*Primary Examiner*—Diego F. F. Gutierrez
*Attorney, Agent, or Firm*—Mark A. Valetti; W. James Brady, III; Richard L. Donaldson

[57] ABSTRACT

A method for obtaining real-time emissivity and temperature values of a semiconductor wafer in a processing system having at least one lamp (preferably a plurality of lamps arranged in a plurality of zones so as to provide multizone temperature and emissivity values for the semiconductor wafer) arranged in at least one zone, the method using a reference wafer having a known reflectivity and the method comprising the steps of: measuring pyrometry signals for the reference wafer (step 202) and generating calibration curves from the measurements; measuring pyrometry signals for the semiconductor wafer; and obtaining the temperature and emissivity values (step 222) from the calibration curves and the measured pyrometry signals (step 220) for the semiconductor wafer.

7 Claims, 3 Drawing Sheets

METHOD FOR TEMPERATURE MEASUREMENT IN RAPID THERMAL PROCESS SYSTEMS

CROSS-REFERENCE TO OTHER APPLICATIONS (issued U.S. patents)

The following co-assigned patent applications are hereby incorporated herein by reference:

Serial No. (U.S. Pat. No. ) Filing Date TI Case No.
08/168,450 (5,443,315) Dec. 16, 1993 TI-17993
08/168,433 (5,444,815) Dec. 16, 1993 TI-17994

FIELD OF THE INVENTION

This invention generally relates to real-time sensors for semiconductor processing and more specifically to a method and system for multi-zone real-time emissivity correction for multi-point temperature sensors.

BACKGROUND OF THE INVENTION

Precise wafer temperature control is vital in all thermally activated steps during an integrated circuit fabrication process sequence. These processes include epitaxial and oxide growth, and dielectric and metal film depositions. The trend towards single wafer processing rather than batch processing requires accurate wafer temperature measurement for successful temperature control. Presently, one of the major impediments for temperature control is the lack of a direct and non-contact measurement of the surface temperature of silicon wafers during processing.

Thermocouples are the most common form of temperature monitoring devices in processing equipment. Thermocouples have several disadvantages. The most significant disadvantage being that they contact the wafer. Poor contact causes a loss of accuracy, and contact with the wafer front side damages the wafer and perturbs the process. Another problem is the lag between the measured temperature and the actual temperature due to the thermal mass of the thermocouple. The thermal mass causes the temperature at the contact point to differ from the true wafer temperature. In addition, there are problems associated with the presence of the metal thermocouple in the harsh environment of the processing chamber. Two such problems are that the thermocouples are attacked by the process gases and are perturbed by RF voltages during plasma processes.

An alternative to thermocouples bonded to the semiconductor wafer is pyrometry. Pyrometry, which offers a direct, non-contact measurement of temperature, runs into difficulties because the emissivity of silicon is a strong function of temperature in the temperature domain of interest. The emissivity is spectrally dependent, and is also dependent on the films on the wafer and surface roughness of the wafer. Thus the emissivity cannot be calculated apriori. This drawback can be overcome with an independent measurement of the emissivity, but this has proven difficult to do. Ellipsometry and variants of ellipsometry, FTIR, the Luxtron-Accubifer RIPPLE technique, and the Quantum Logic technique, are all capable of real-time emissivity measurement, but are not compatible with either multi-zone lamp heating/control or with multi-zone pyrometry, both of which are essential for rapid thermal processing (RTP). Other techniques for emissivity measurement such as monitoring the surface reflectance using an infrared source, are also not compatible with multi-zone pyrometry. Techniques that are based on the thermal expansion of silicon such as the Peak μ-Temp approach, or the diffraction monitoring of a probe laser beam by a diffraction grating are not compatible with multi-zone pyrometry, and also need an independent measurement of the initial wafer temperature. Thus there is a need for an approach that combines pyrometry with real-time emissivity measurement and is compatible with multi-zone lamp heating/control and multi-zone pyrometry.

SUMMARY OF THE INVENTION

One embodiment of the instant invention is a method and an apparatus for analyzing radiation from pyrometers in order to measure the wafer temperature and wafer emissivity in real-time. The method of the instant invention is compatible with rapid thermal processing (RTP), and with RTP reactors that use multi-zone lamp heating/control and multi-zone pyrometry. This method involves using a high reflectivity calibration wafer of known reflectivity for determining the contribution of the radiation emanating directly from the lamps and reflected from the wafer to the pyrometer signal, and time-modulating the power to the lamp zones to obtain the wafer emissivity and temperature in real-time.

One embodiment of the present invention is a method for obtaining real-time emissivity and temperature values of a semiconductor wafer in a processing system having at least one lamp (preferably a plurality of lamps arranged in a plurality of zones so as to provide multizone temperature and emissivity values for the semiconductor wafer) arranged in at least one zone, the method using a reference wafer having a known reflectivity and the method comprising the steps of: measuring pyrometry signals for the reference wafer and generating calibration curves from the measurements; measuring pyrometry signals for the semiconductor wafer; and obtaining the temperature and emissivity values from the calibration curves and the measured pyrometry signals for the semiconductor wafer. Preferably the calibration curves are obtained according to the equation:

$$S_{100,j} = C_1[f_j(P_j)] = \frac{S_{c,j}}{r_c}$$

wherein: $S_{c,j}$ is the measured pyrometry signal for the reference wafer; and $r_c$ is the known reflectivity of the reference wafer.

Another embodiment of the present invention is a method for obtaining emissivity and temperature values of a semiconductor wafer in real-time in a processing system having at least one lamp (preferably a plurality of lamps arranged in a plurality of zones so as to provide multizone temperature and emissivity values for the semiconductor wafer) arranged in at least one zone, the method using a reference wafer having a known reflectivity and the method comprising the steps of: measuring pyrometry signals for the reference wafer and generating calibration curves from the measurements; measuring pyrometry signals for the semiconductor wafer by time modulating the lamps so as to obtain a time-averaged component of the pyrometry signal and a time-varying component of the pyrometry signal; and obtaining the temperature and emissivity values from the calibration curves and the measured pyrometry signals for the semiconductor wafer. Preferably, the calibration curves are obtained according to the equation:

$$S_{100,j} = C_1[f_j(P_j)] = \frac{S_{c,j}}{r_c}$$

wherein: $S_{c,j}$ is the measured pyrometry signal for the reference wafer; and $r_c$ is the known reflectivity of the reference wafer. In addition, the time-varying component of the pyrometry signal can be obtained by:

$$S_{ac} = C_1 \left[ r\Sigma \frac{\partial f_j}{\partial P_j} P_{ac,j} \right]$$

wherein: $C_1$ is a calibration constant; $P_{dc,j}$ is the time-averaged (DC) power of lamp zone j; and $f_j(P_{dc,j})$ is the time-averaged intensity of the lamp radiation that is incident on the wafer. Preferably, the time-varying component of the pyrometry signal can be determined by:

$$S_{ac} = \left[ r\Sigma \frac{\partial S_{100,j}}{\partial P_j} P_{ac,j} \right]$$

wherein: $\partial S_{100,j}/\partial P_j$ is the slope of the calibration curve for $S_{100,j}$ as a function of lamp power, $P_j$; and $P_{ac,j}$ is the time-varying component of lamp power. Additionally, the temperature can be obtained from the functional dependence of the Plank function, h(T), on temperature and utilizing this in:

$$h(T) = C_1 g(T) = \frac{1}{\epsilon} [S_{dc} - r\Sigma S_{100,j}(P_{dc,j})]$$

wherein: $S_{dc,j}$ is the time-averaged value of the pyrometry signal; and $S_{100,j}(P_{dc,j})$ represents individual points on the pyrometry calibration curve for a highly reflective wafer as a function of lamp power. The emissivity can be obtained from:

$$r = 1 - \epsilon = \frac{S_{ac}}{\Sigma \gamma_j P_{ac,j}}$$

wherein: $\epsilon$ is the emissivity; r is the reflectance of the semiconductor wafer; $S_{ac,j}$ is the time-varying component of the pyrometry signal; $P_{ac,j}$ is the time-varying component of the $j^{th}$ lamp power; and $\gamma_j$ is slope of the pyrometry calibration curve as a function of lamp power.

An advantage of the invention is providing a multi-zone real-time emissivity correction system that measures the real-time emissivity in each zone and provides wafer temperature values adjusted for emissivity. Another advantage is providing spectral emissivity measurements having identical spectral sensitivity and view factor as the measurement for wafer radiance. A third advantage is providing a multi-zone emissivity correction system that may be combined with multi-zone lamp interference correction to provide wafer temperature values adjusted for both lamp interference and emissivity. These and other advantages will be apparent to those of ordinary skill in the art having reference to this specification in conjunction with the accompanying figures.

In summary, one embodiment of the instant invention is a method for analyzing radiation from pyrometers in order to measure the wafer temperature and wafer emissivity in real-time. The method of the instant invention involves using a known, high reflectivity calibration wafer for determining the contributions of the radiation from the lamps and lamp light reflected by the wafer to the pyrometer signal, and time-modulating the power to the lamp zones to obtain the wafer emissivity and temperature in real-time. This method is compatible with rapid thermal processing (RTP), and with RTP reactors that use multi-zone lamp heating/control and multi-zone pyrometry. Implementation of this method is considerably simplified for a DC powered lamp in comparison to an AC powered lamp.

DETAILED DESCRIPTION OF THE INVENTION

The preferred embodiment of the invention will be described in conjunction with a single wafer advanced vacuum processor (AVP) having a reactor adapted for rapid thermal chemical vapor deposition of tungsten (RTCVD-W). It will be apparent to those skilled in the art that the invention is equally applicable to other reactor and AVP configurations.

Figure 1:
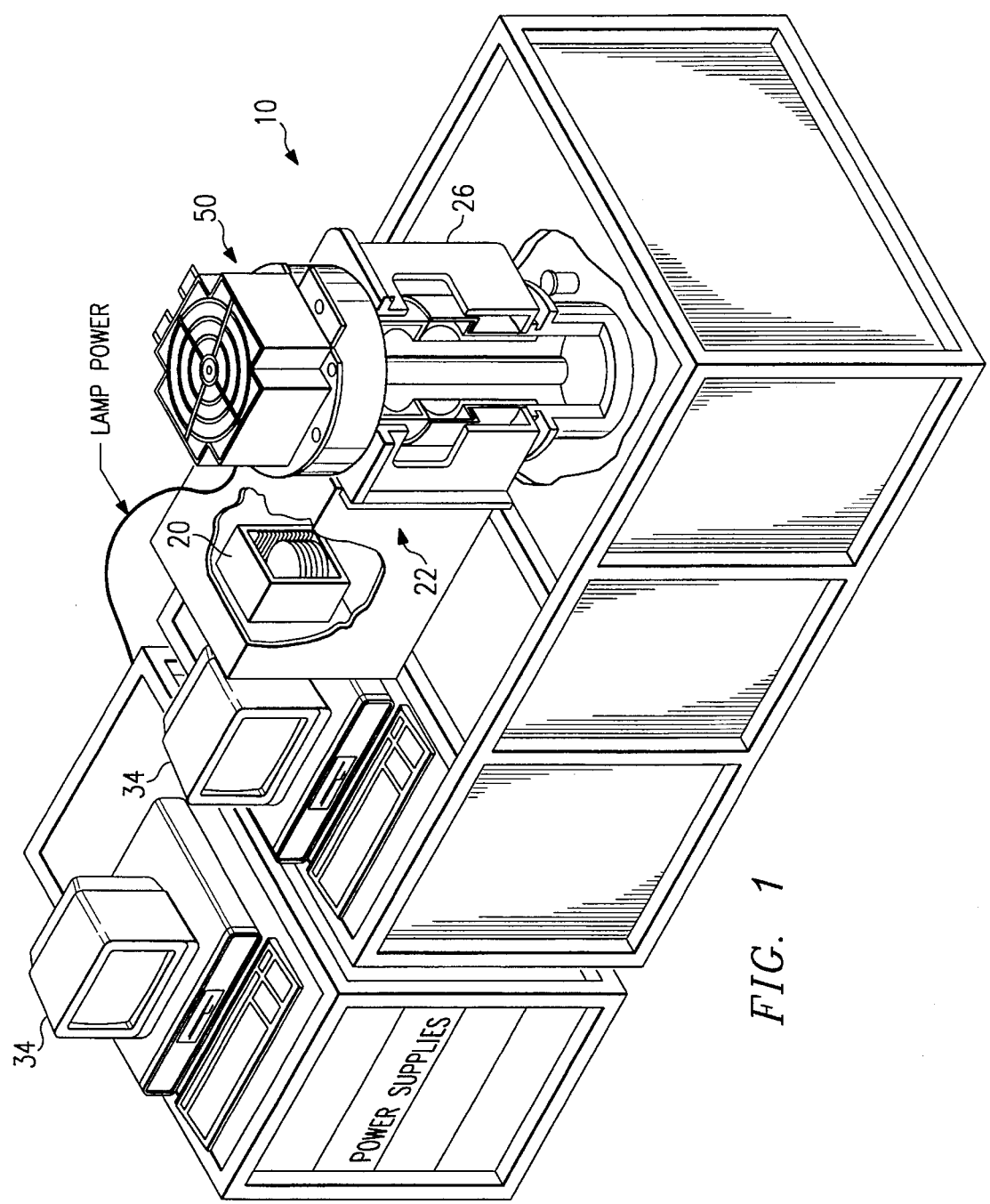
FIG. 1 is a diagram of an advanced vacuum processing system according to an embodiment of the present invention.
Figure 2:
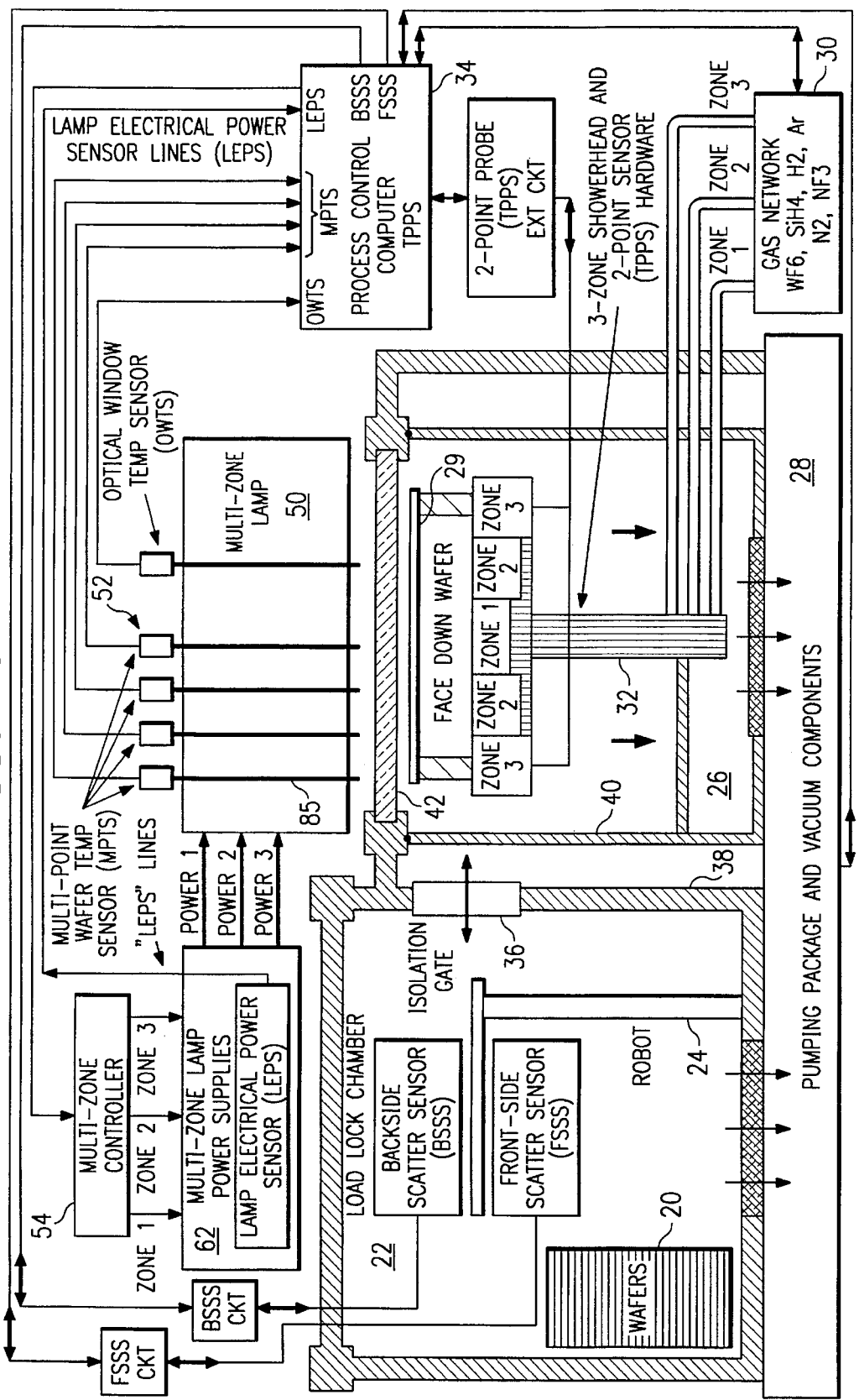
FIG. 2 is a block diagram of an RTP-AVP system with multi-point pyrometry sensors according to an embodiment of the present invention.

As shown in FIGS. 1 and 2, the AVP machine 10, according to the invention, is a modular system that consists of a vacuum cassette 20, vacuum loadlock 22, robot handler 24, process chamber 26, vacuum pumping network 28, gas flow/control 30, gas injectors 32, and computer/electronics/software 34. The system typically occupies a footprint of 3 ft.×5 ft. and is approximately 4 ft. high. The vacuum cassette 20 may be constructed of machined aluminum with Tufram coating, and have a hinged door (not shown) for opening and closing under vacuum. The vacuum cassette 20 is typically placed under vacuum by pumping down in the vacuum loadlock 22, closing the hinged door, then venting the vacuum loadlock 22. The cassette 20 can then be removed under vacuum and moved to the next machine for processing. The vacuum cassette 20 eliminates the need for super-clean rooms since wafers can be stored under vacuum and moved from machine to machine under vacuum.

The vacuum loadlock 22 may be constructed of anodized aluminum and house the vacuum cassette 20 and robot wafer handler 24. The robot wafer handler 24 has horizontal and vertical motion such that the wafer cassette 20 remains stationary. An isolation gate 36 is provided between the vacuum loadlock 22 and the process chamber 26 to maintain integrity for the process chamber 26, during manual insertion/removal of the vacuum cassette 20. The process chamber 26 may have a stainless steel outer chamber 36, and an inner chamber 40, made of various materials that depend on the process and sensor application. Typically, the inner chamber consists of a quartz cylinder top 42, aluminum gas injector 32, and aluminum electrodes (not shown) for etch processes. Rapid thermal processes (RTPs) typically require quartz apertures, quartz chamber liners within all-metal stainless steel chambers, and nickel-plated gas injectors. The inner process chamber provides a small vacuum chamber inside a larger vacuum chamber and provides a symmetrical processing environment for the wafer 29 in process.

The gas/control module 30 may consist of up to 18 mass-flow controllers (MFCs) housed in a safety-approved box with associated stainless steel plumbing to carry the process gasses to the process chamber 26 through point-of-use filters. The vacuum pumping network 28 typically consists of a "roughing" pump/blower module having a 250-cfm pumping capacity for the process chamber, a 60-cfm roughing pump for the loadlock 22, 400–1000–1/sec turbo pumps for loadlock 22 and process chamber 26. Appropriate throttle valves 12 and full-closure valves may be provided for automated pumping, pressure control, and venting.

The RTP reactors employ multi-zone illuminators 50 with concentric heating zones and several in-situ sensors 52. One such multi-zone illuminator is described in U.S. patent application Ser. No. 07/870,446, filed Apr. 16, 1992, now U.S. Pat. No. 5,268,989, and assigned to Texas Instruments Incorporated and is hereby incorporated by reference. The multi-zone illuminators 50 are typically used in rapid thermal processes (anneals, oxidations, nitridations, and chemical-vapor depositions) and consist of an array of concentric heating zones that provide infrared energy to the single wafer 29 through a quartz window 42. The specific reactor example shown in FIG. 2 is for a rapid thermal CVD tungsten (RTCVD-W) process. These RTP-AVP systems preferably employ high-performance multi-zone illuminators 50 with 4 axisymmetric zones for uniform wafer heating. However, the number of zones may vary. The RTP-AVP system of FIG. 2 consists of 3 axisymmetric zones (1–3). Wafer processing and heating are performed face-down and from the backside, respectively. Power levels to the lamp zones can be adjusted in real time using a multi-zone controller 54 for optimum wafer temperature and process uniformity.

The system of the present invention uses a standard multi-zone pyrometer system arranged so that each one images the radiation emitted or reflected from a small spot on the wafer. (For further discussion on pyrometry see the following issued U.S. Pat. Nos. assigned to Texas Instruments, Inc. and herewith incorporated by reference: 4,956,538; 5,156,461; 5,317,656; and 5,305,417.) The pyrometer optics are arranged so that they receive radiation only from the wafer and not stray radiation. In addition, pyrometer locations are optimized based on the multi-zone control requirements. In general, the pyrometer locations will roughly correspond to the zones of influence on the wafer corresponding to each of the lamp zones. For example, the central lamp zone might have maximum influence on the temperature at the center of the wafer, and hence a pyrometer should be located to image the radiation emanating from the center of the wafer. Thus the zone of influence of the center lamp zone is the center of the wafer, and one pyrometer should preferably be located so that it emanates or collects radiation from the center of the wafer. The pyrometer wavelength should be chosen so that the wafer is opaque at these wavelengths. Also the emission from the wafer must have a significant component at these wavelengths relative to the radiation from the lamp. While the pyrometer can be used to image the radiation from either surface of the wafer, higher accuracy can be obtained for the unpatterned wafer backside. To minimize collection of the lamp radiation, the pyrometers should preferably not directly receive the lamp radiation. Shielding the pyrometers from as much lamp radiation as possible increases the signal-to-noise ratio (S/N ratio) of the measurement.

For such a system, the pyrometer signal (S) can be expressed as:

$$S = C_1[\epsilon g(T) + r\Sigma f_j(P_j)] \tag{1}$$

where $C_1$ is a calibration constant, $\epsilon$ is the spectral emissivity of the wafer at the wavelength of the pyrometer, $r$ is the reflectance of the wafer at the wavelength of the pyrometer, $P_j$ is the lamp power of lamp zone j, g(T) is the Planck function for the radiation intensity emitted by the wafer within the wavelength interval of the pyrometer, and $f_j(P_j)$ is the corresponding intensity of lamp and chamber radiation reflected from the wafer within the wavelength interval of the pyrometer for lamp zone j at a given lamp zone power $(P_j)$. This equation assumes that the pyrometer signal is linearly proportional to the collected radiation. This is done so that the summation of intensities due to emission from the wafer and lamp radiation reflected from the wafer for each of the lamp zones is valid. If this is not the case, the signal may be transformed electronically, so that the above assumption is valid. Summation of the intensities due to the various sources to obtain the total intensity is valid because the sources are not coherent.

Figure 3:
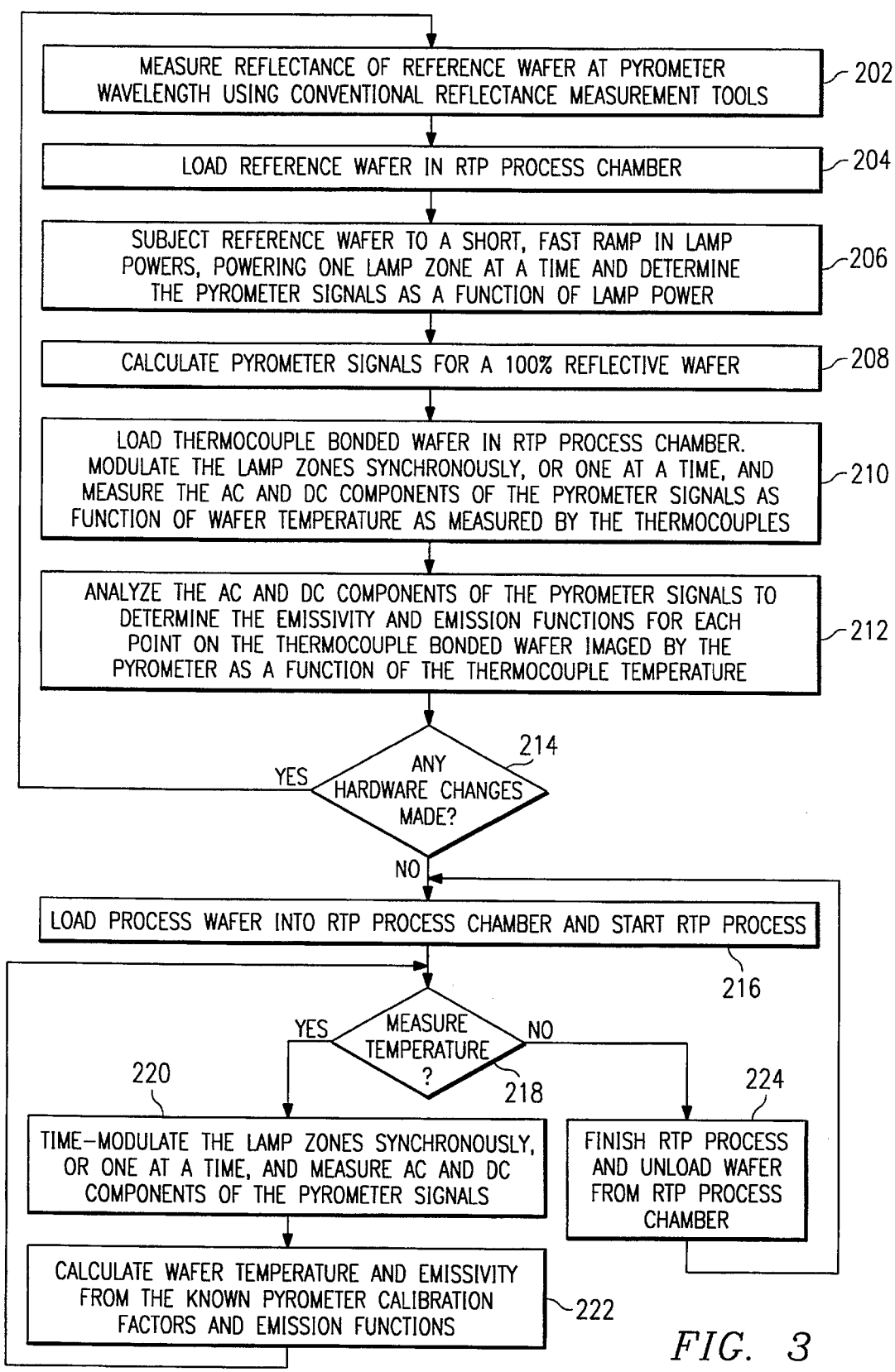
FIG. 3 is a flow chart depicting a process flow of the present invention.

Referring to FIG. 3, the first step in one embodiment of the instant invention, step 202, is to measure the reflectance of the reference wafer at the pyrometer wavelength. This can be done using conventional reflectance measurement methods and equipment. Step 202 may be omitted from this process flow if the reflectance of the reference wafer, at the desired wavelength, is known. The second step, step 204, is to load the reference wafer into the RTP chamber, and subject it to a short, fast ramp in lamp powers, so that the pyrometer signal (S) can be measured as a function of lamp power for each of the lamp zones. This is step 206. The short ramp of step 206 ensures that this high reflectivity calibration wafer is not heated appreciably, so that its reflectivity does not change, and emission from the wafer is negligible compared to the lamp and chamber radiation reflected by the wafer. Such a wafer with a high known reflectivity can be constructed by sputter depositing an aluminum film over a silicon wafer, and covering the aluminum with a thin protective oxide overcoat. Referring to step 208, using the method above a family of calibration curves of pyrometry signals can be obtained for each of the lamp zones as a function of lamp power to the zone. These curves are derived using equation (2) and the measured pyrometry signal, $S_{c,j}$, for zone j:

$$S_{c,j} = C_1[r_c f_j(P_j)] \tag{2}$$

where $r_c$ is the known reflectivity of the calibration wafer at the wavelength of the pyrometer. The emission term, $\epsilon g(T)$, has been dropped because emission is negligible for a highly reflective wafer at low temperatures. Using equation (2), it is possible to calculate the signal corresponding to a 100% reflective surface as follows:

$$S_{100,j} = C_1[f_j(P_j)] = \frac{S_{c,j}}{r_c} \tag{3}$$

In this manner it is possible to obtain a family of curves for $S_{100,j}$ as a function of power $(P_j)$ to the corresponding lamp zone j. Referring to step 212, once such calibration curves have been obtained, the wafer temperature and emissivity can be determined during the process for the actual wafers. For the actual wafers, the power to the lamp zones is modulated so that the maximum and minimum power to the lamp zones are given by:

$$P_{max,j} = P_{dc,j} + P_{ac,j} \tag{4}$$

$$P_{min,j} = P_{dc,j} - P_{ac,j} \tag{5}$$

where $P_{dc,j}$ is the time-averaged (DC) power of lamp zone j, and $P_{ac,j}$ is the amplitude modulation (AC) of the power of lamp zone j. The modulation amplitude $P_{ac,j}$ should be a small fraction (0.1–0.3) of the time-averaged power, the modulation applied to all the lamp zones should preferably be in phase, and the modulation frequency should preferably be chosen so that it is smaller than the frequency corresponding to the time-response of the lamp filament temperature, yet high enough to ensure that the wafer temperature is not perturbed while providing adequate time resolution during a fast wafer temperature ramp of up to 50 C/s. As long as the modulation frequency is sufficiently high, and the modulation amplitude is sufficiently small, the wafer temperature will not respond to the modulation in lamp zone power.

These requirements may be mutually exclusive, but the first requirement should preferably be satisfied for this scheme to perform optimally. Other methods for improving the time-response of the measurement system are discussed below. For lamps that are powered by 60 Hz AC, the modulation frequency should preferably also be a small fraction (0.05–0.1) of this frequency. Alternatively, it is possible to use DC powered lamps, for which the above is not a requirement.

If phase matching is difficult to achieve, only a single lamp zone may be modulated. However, the lamp zone that should preferably be modulated should correspond to the pyrometer signal that is being analyzed. For example, if the signal from the pyrometer imaging the center of the wafer is being analyzed, the lamp zone that heats the center of the wafer should preferably be modulated. The lamp zone that should preferably be modulated can be obtained by examining the gain matrix of the lamp system. From this, the zone that provides the maximum signal-to-noise ratio (S/N) for the AC component of the pyrometer signal should preferably be the zone that is modulated. If, however, the signals from four pyrometers have to be analyzed, the lamp zones should preferably be modulated in sequence.

Referring to step 220, the time-modulation of the lamp zone power leads to a modulation of the pyrometer signal which can be expressed as:

$$S_{dc} = C_l[\epsilon g(T) + r\Sigma f_j(P_{dc,j})] \quad (6)$$

$$S_{ac} = C_l \left[ r\Sigma \frac{\partial f_j}{\partial P_j} P_{ac,j} \right] \quad (7)$$

Mathematically, $S_{dc}$ and $S_{ac}$ can also be expressed as:

$$S_{dc} = \frac{S_{max} + S_{min}}{2}$$

$$S_{ac} = \frac{S_{max} + S_{min}}{2}$$

where $S_{dc}$ is the time-averaged signal $S_{ac}$ is the amplitude-modulation of the signal, and $S_{max}$ is the maximum value of the pyrometry signal and $S_{min}$ is the minimum value of the signal. Equation (6) assumes that the time-averaged value of $f_j(P_j)$ is equal to $f_j(P_{dc,j})$. This is valid provided $P_{ac,j}$ is a small fraction of $P_{dc,j}$, and $f_j(P_j)$ can be linearized in the interval $[P_{dc,j}-P_{ac,j}]$ to $[P_{dc,j}+P_{ac,j}]$.

Using equation (3), equation (7) can be written as:

$$S_{ac} = \left[ r\Sigma \frac{\partial S_{100,j}}{\partial P_j} P_{ac,j} \right] \quad (8)$$

where $\partial S_{100,j}/\partial P_j$ is the slope of the calibration curve for $S_{100,j}$ as a function of lamp power, $P_j$.

Denoting the quantity $\partial S_{100,j}/\partial P_j$ by $\gamma_j$ which can be obtained from the family of calibration curves for $S_{100,j}$ as a function of lamp power to zone j, it is possible to obtain an expression for the reflectance of the wafer.

$$r = 1 - \epsilon = \frac{S_{ac}}{\Sigma \gamma_j P_{ac,j}} \quad (9)$$

Referring to step 222, for an opaque wafer the emissivity is equal to 1–r. In this manner, the real-time emissivity can be obtained.

Finally, the temperature, T, can be obtained by combining equations (3), (6), and (9):

$$h(T) = C_1 g(T) = \frac{1}{\epsilon} [S_{dc} - r\Sigma S_{100,j}(P_{dc,j})] \quad (10)$$

where $\epsilon$ is the spectral emissivity of the wafer.

While the quantity h(T) can be calculated from first principles, it is probably expedient to determine it using a thermocouple bonded wafer. In order to do this, the thermocouple bonded wafer should be ramped up in temperature gradually so that the thermocouple reaches equilibrium, with respect to the wafer temperature, at all times during the ramp, and the quantity h(T) should be calculated using equation (10) for each thermocouple temperature. This provides the value of h(T) as a function of temperature, or, alternatively, the temperature can be determined if h(T) is measured at an unknown temperature.

To improve the accuracy of the temperature measurement technique the known functional dependence of h(T) (which is the Planck function to within a constant factor) on the temperature, T, can be utilized. One way of doing this is by calculating the slope of the function h'(T)=dh/dT. The ratio h'(T)/h(T) is solely dependent on the temperature, and hence the temperature can be extracted. More elaborate schemes relying on least squares minimization can also be used.

For the actual wafer, the reflectance and emissivity at any given temperature are calculated using equation (9), and h(T) is calculated using equation (10). The temperature can then be obtained from the known functional dependence of h(T) on T. In this manner, the pyrometer signal can be used to determine the wafer temperature and emissivity in real-time. This methodology is repeated (steps 218–222) as often as necessary during the RTP to measure the wafer temperature. This approach has been described for a single pyrometer and extension to multiple pyrometers is possible in view of the above description of the instant invention.

For cases where the wafer ramp-up is faster than the time-resolution of the temperature measurement method (due to restrictions on the maximum modulation frequency) a predictor-corrector method may be used to calculate the temperature to enable multi-zone control, especially during ramp-up. In such a method, the time-value of the wafer temperature should preferably be continuous, and this can be used to predict the temperature based on prior values. This temperature value is updated when the measurement becomes available. Another option, which is probably more reliable, is to update the wafer emissivity on a slower time scale than the wafer temperature, since the wafer emissivity is usually a slowly varying function of temperature. Thus at any instant, the wafer temperature is calculated using equation (10) using the current value of the wafer emissivity, and the wafer emissivity is updated when a new set of data are available for solving equation 9.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

We claim:

1. A method for real-time obtaining emissivity and temperature values of a semiconductor wafer in a processing system having at least one lamp arranged in at least one zone, said method using a reference wafer having a known reflectivity and said method comprising the steps of:

measuring pyrometry signals for said reference wafer and generating calibration curves from said measurements;

measuring pyrometry signals for said semiconductor wafer by time modulating said lamps so as to obtain a time-averaged component of said pyrometry signals and an amplitude-modulated component of said pyrometry signals; and obtaining said temperature and emissivity values from said calibration curves and said measured pyrometry signals for said semiconductor wafer.

2. The method of claim 1 wherein said at least one lamp is a plurality of lamps arranged in a plurality of zones so as to provide multizone temperature and emissivity values for said semiconductor wafer.

3. The method of claim 1 wherein said calibration curves are obtained according to the equation:

$$S_{100,j} = C_1[f_j(P_j)] = \frac{S_{c,j}}{r_c}$$

wherein:

$S_{c,j}$ is the measured pyrometry signal for said semiconductor wafer; and $r_c$ is the known reflectivity of the reference wafer;

$C_1$ is a calibration constant; and $f_j(P_j)$ is lamp intensity and chamber radiation reflected from the semiconductor wafer within a wavelength interval of the pyrometer for lamp zone J at a give lamp power, $P_j$.

4. The method of claim 1 wherein said amplitude-modulated component of said pyrometry signals can be determined by:

$$\frac{S_{max} - S_{min}}{2} = S_{ac} = \left[ r\Sigma \frac{\partial S_{100,j}}{\partial P_j} P_{ac,j} \right]$$

wherein:

$\partial S_{100,j}/\partial P_j$ is the slope of the calibration curve for $S_{100,j}$ as a function of lamp power, $P_j$;

$P_{ac,j}$ is the amplitude-modulated component of lamp power; and r is the reflectance of the semiconductor wafer.

5. The method of claim 1 wherein said temperature can be obtained from the functional dependence of the Plank function, h(T), on temperature and utilizing this in:

$$h(T) = C_1 g(T) = \frac{1}{\epsilon} [S_{dc} - r\Sigma S_{100,j}(P_{dc,j})]$$

wherein:

$S_{dc}$ is the time-averaged value of the pyrometry signal;

$S_{100,j}(P_{dc,j})$ represents individual points on the pyrometry calibration curve for a highly reflective wafer as a function of lamp power; and $\epsilon$ is the spectral emissivity of the semiconductor wafer.

6. The method of claim 1 wherein said emissivity is obtained from:

$$r = 1 - \epsilon = \frac{S_{ac}}{\Sigma \gamma_j P_{ac,j}}$$

wherein:

$\epsilon$ is the emissivity;

r is the reflectance of the semiconductor wafer;

$S_{ac}$ is the amplitude-modulated component of the pyrometry signal;

$P_{ac,j}$ is the amplitude-modulated component of the $j^{th}$ lamp power; and $\gamma_j$ is slope of the pyrometry calibration curve as a function of lamp power.

7. The method of claim 1 wherein said time-averaged component of said pyrometry signals can be obtained by:

$$\frac{S_{max} + S_{min}}{2} = S_{dc} = C_1[\epsilon g(T) + r\Sigma f_j(P_{dc,j})]$$

wherein:

$C_1$ is a calibration constant;

$P_{dc,j}$ is the time averaged (DC) power of lamp zone j;

$S_{max}$ and $S_{min}$ are maximum and minimum values of said pyrometer signals;

$\epsilon$ is the spectral emissivity of the wafer;

g(T) the Planck function for the radiation intensity emitted by the wafer within the wavelength interval of the pyrometer;

r is the reflectance of the semiconductor wafer; and $f_j(P_{dc,j})$ is lamp intensity and chamber radiation reflected from the wafer within the wavelength interval of the pyrometer for lamp zone j at a given averaged lamp zone power $(P_{dc,j})$.

* * * * *